United States Patent
Usami et al.

(10) Patent No.: US 7,368,156 B2
(45) Date of Patent: May 6, 2008

(54) METHOD FOR MANUFACTURING DISCOID OPTICAL RECORD MEDIUM AND DISCOID OPTICAL RECORD MEDIUM

(75) Inventors: Mamoru Usami, Tokyo (JP); Tomoki Ushida, Tokyo (JP); Kenji Yamaga, Tokyo (JP); Yoshimi Sakai, Tokyo (JP)

(73) Assignee: TDK Corporation, Tokyo (JP)

( * ) Notice: Subject to any disclaimer, the term of this patent is extended or adjusted under 35 U.S.C. 154(b) by 605 days.

(21) Appl. No.: 10/501,508

(22) PCT Filed: Jan. 17, 2003

(86) PCT No.: PCT/JP03/00389

§ 371 (c)(1),
(2), (4) Date: Aug. 27, 2004

(87) PCT Pub. No.: WO03/060896

PCT Pub. Date: Jul. 24, 2003

(65) Prior Publication Data

US 2005/0007945 A1    Jan. 13, 2005

(30) Foreign Application Priority Data

Jan. 17, 2002    (JP)    .............................. 2002-009000

(51) Int. Cl.
*B32B 3/02*    (2006.01)

(52) U.S. Cl. ............... 428/64.1; 428/64.4; 430/270.11; 425/289

(58) Field of Classification Search ............... 428/64.1, 428/64.4; 430/270.11; 425/289
See application file for complete search history.

(56) References Cited

U.S. PATENT DOCUMENTS

| 2006/0023618 A1* | 2/2006 | Tomiyama et al. ...... 369/275.1 |
| 2006/0177534 A1* | 8/2006 | Usami et al. ................ 425/289 |

FOREIGN PATENT DOCUMENTS

| JP | A 59-203257 | 11/1984 |
| JP | A 63-203308 | 8/1988 |
| JP | A 7-141704 | 6/1995 |
| JP | A 10-40579 | 2/1998 |
| JP | A 10-40584 | 2/1998 |
| JP | A 10-64121 | 3/1998 |
| JP | A 10-289489 | 10/1998 |
| JP | A 11-169965 | 6/1999 |
| JP | A 2002-298453 | 10/2002 |

* cited by examiner

*Primary Examiner*—Elizabeth Mulvaney
(74) *Attorney, Agent, or Firm*—Oliff & Berridge, PLC

(57) ABSTRACT

A disc-shaped optical recording medium formed by carrying out a film formation process on a disc-shaped substrate material and completed by forming a center hole at the last step is manufactured in a manner such that no eccentricity will occur when the recording medium is loaded onto a drive.

At the last step of an optical disc manufacturing process, i.e., at the time of opening a hole in the center part 26 of the disc-shaped substrate material 12 formed with at least a resin layer on one side thereof, the center part 26 is removed in a manner such that the diameter of the chucking center hole 28 is larger on the disc-shaped substrate material 12 side than on the light transmitting resin layer 22 side of the disc-shaped optical recording medium 30, thereby manufacturing the disc-shaped optical recording medium 30.

17 Claims, 4 Drawing Sheets

(A)

(B)

METHOD FOR MANUFACTURING DISCOID OPTICAL RECORD MEDIUM AND DISCOID OPTICAL RECORD MEDIUM

TECHNICAL FIELD

The present invention relates to a method for manufacturing a disc-shaped optical recording medium and a disc-shaped optical recording medium.

BACKGROUND ART

Generally, a disc-shaped optical recording medium (optical disc), such as CD (Compact Disc) and DVD (Digital Versatile Disc), is manufactured by attaching a stamper formed in a mastering process to a mold disposed within an injection molding machine, forming a disc-shaped substrate made of resin material by injection molding over an area forming an information recording surface, forming a recording layer capable of recording and a reflection layer capable of playing-back on the disc-shaped substrate, and forming thereon a protective layer made of resin.

The above discs are irradiated with a predetermined laser beam passing through the aforementioned disc-shaped substrate material, thereby performing information recording and/or playback.

Further, as disclosed in Japanese Patent Laid-Open Publication No. Hei 8-235638, an attention has recently been given to an optical disc which is manufactured by: first forming, as a disc-shaped substrate material (substrate), a thick support layer (protective layer) not required to be light-transmissible, i.e., not required to have an optical thickness by means of injection molding; and forming a reflection layer on the information recording surface side of the substrate for effecting a playback, or a recording layer or the like on that side for effecting a recording, followed by laminating a light transmitting layer based on a transparent resin layer which allows the passing of a laser beam for recording or playing back.

Conventionally, an optical disc has been manufactured in the following way. Namely, at the time of performing an injection molding to form a substrate, the center part of the substrate as well as a sprue runner solidified within the gate during the injection molding are removed so that a center hole is formed on the center part of the substrate so as to form a disc-shaped substrate material. Further, after forming the above reflection layer and the recording layer which has been constituted to be able to perform recording, a spin coating process is performed to form a protective layer made of a resin, or a light transmitting layer comprising a light transmitting resin.

As a characterizing method for manufacturing the aforementioned protective layer and the aforementioned light transmitting layer, Japanese Patent Laid-Open Publication No. Hei 10-249264 discloses that a lid member for covering the center hole of an optical disc is disposed, and then a resin is applied to the entire optical disc over the lid member while the disc rotates and solidified thereafter, thus forming a protective layer (resin layer). Since this method can easily control the thickness of the resin layer within an applying surface such that a substantially uniform state is achieved in the radial direction, the same method can also be used in a light transmitting layer formation process disclosed in Japanese Patent Laid-Open Publication No. 1996-235638.

In order to use the above-described resin layer rotational applying method to form a resin layer in a more uniform state, it is necessary to have a lid member to block the center hole of a disc-shaped substrate material.

When using such a manufacturing method, it is desired that the lid member be clean. When a single lid member is used, the lid member must be cleaned after every use in resin coating. Alternatively, the lid member must be disposable, so that a new (clean) lid member is always used.

Further, as described above, when the center hole is closed by the lid member during the spin coating process, since the light transmitting resin usually flows downward from the lid member to the disc-shaped substrate, air bubbles are apt to occur within the resin layer and irregular flow traces are likely to appear on the surface of the resin layer, all due to a difference in height between the lid member and the surface of the disc-shaped substrate, hence resulting in non-uniform thickness of the resin layer (non-uniform film thickness).

On the other hand, as disclosed in Japanese Patent Laid-Open Publication No. Hei 5-92492 as well as in Japanese Patent Laid-Open Publication No. Hei 5-185477, there have been suggested optical disc manufacturing methods in which the center hole of a disc-shaped substrate is formed immediately after the formation of the disc-shaped substrate itself, instead of forming such a center hole during the formation of the disc-shaped substrate, thus minimizing an influence from burr or resin waste generated due to the punching of the center hole.

Since the aforementioned methods aim at minimizing an influence from burr or resin waste, they are characterized in that the center hole is formed immediately after the formation of the disc-shaped substrate, with the sprue runner and the center part being removed simultaneously prior to the formation of a light transmitting resin layer.

In view of the above, the applicant of the subject application has already suggested an optical disc manufacturing method (not publicly known) which is simpler and has a higher yield in forming resin layer than a conventional manufacturing method using a lid member.

According to the suggested method, during the injection molding which is one step in manufacturing an optical disc, a disc-shaped substrate material is taken out integrally with the center part of a disc-shaped substrate and the sprue runner, passed through a film formation step and a resin layer formation step, followed by simultaneously removing the center part and the sprue runner as a last step, thereby forming the optical disc.

According to the above-described method for manufacturing a disc-shaped optical recording medium in which the center part is punched at the last step to form the center hole which is a chucking hole, during the step of punching the center hole, burr will generate along the hole edge in the thickness direction of the formed center hole. In this case, once the disc-shaped optical recording medium is loaded onto a drive, there will be a problem that an eccentricity can occur during the rotation of the recording medium due to such burr.

Moreover, when the center hole is punched at the last step of the above-described manufacturing process, if the disc-shaped substrate material is set eccentric with respect to a tool such as an ultrasonic press, the center hole will deviate from the center of the disc-shaped optical recording medium, resulting in a problem that it is difficult to perform a correct information recording or playback.

DISCLOSURE OF THE INVENTION

This invention has been accomplished in view of the aforementioned conventional problem, and an object of the invention is to provide a method for manufacturing a disc-shaped optical recording medium capable of preventing an eccentricity of the recording medium possibly caused due to a burr when the medium is chucked to a drive and preventing an eccentricity of the center hole from the disc center. Another object of the invention is to provide such a disc-shaped optical recording medium itself.

The inventor of the present invention, as a result of the diligent research, has found that at the time of opening a hole in the center part of a disc-shaped substrate material, i.e. at the last step of an optical disc manufacturing process, if the center part is removed and a disc-shaped optical recording medium is manufactured in a manner such that the diameter of a chucking hole on the non-recording surface side (disc-shaped substrate material side) of the disc-shaped optical recording medium is larger than that on the information recording side (resin layer side) of the medium, it is possible to prevent an eccentricity during chucking which is caused due to burr.

Namely, the following aspect of the present invention attains the object described above.

(1) A method for manufacturing a disc-shaped optical recording medium, comprising the steps of forming at least a resin layer on one side of a disc-shaped substrate material, and removing a center part thereof substantially circularly in a manner such that the diameter of the center hole on the resin layer side becomes smaller than the diameter of the center hole on the disc-shaped substrate material side, thereby forming a chucking hole.

(2) The method for manufacturing a disc-shaped optical recording medium according to (1), wherein the center part is removed from the resin layer side.

(3) The method for manufacturing a disc-shaped optical recording medium according to (1) or (2), wherein at the time of removing the center part, a partial area confirmable from said resin layer side is used as a reference in positioning.

(4) The method for manufacturing a disc-shaped optical recording medium according to (1) or (2), wherein at the time of removing the center part, a partial area on the disc-shaped substrate material side is used as a reference in positioning.

(5) The method for manufacturing a disc-shaped optical recording medium according to (3), wherein the partial area used as the reference for positioning is an information track for recording information, the information track is optically detected and used as the reference for positioning the center part.

(6) The method for manufacturing a disc-shaped optical recording medium according to (3), wherein on an information recording surface formed on the resin layer side and containing at least one of a groove and a pit for recording/playing back information, there is provided a continuous area of the one of the groove and the pit serving as a positioning reference, and the continuous area is optically detected and used as the reference for positioning said center part.

(7) The method for manufacturing a disc-shaped optical recording medium according to (3), wherein the disc-shaped optical recording medium has a groove-containing recording area on the resin layer side, and a mirror area located inside or outside the recording area, and wherein a boundary line between the mirror area and the grooves of the recording area is optically detected and used as the reference for positioning the center part.

(8) The method for manufacturing a disc-shaped optical recording medium according to (5), (6) or (7), wherein a CCD line sensor for detecting a reflected beam from the resin layer side is used to optically detect the reference for positioning.

(9). The method for manufacturing a disc-shaped optical recording medium according to (4), wherein the partial area located on the disc-shaped substrate material side and used as the reference for positioning is a concave portion formed substantially circularly near the center of the disc-shaped substrate material.

(10) The method for manufacturing a disc-shaped optical recording medium according to (4), wherein the partial area located on the disc-shaped substrate material side and used as the reference for positioning is an outer periphery edge portion of the disc-shaped substrate material.

(11) A disc-shaped optical recording medium, having at least a resin layer on a disc-shaped substrate material, wherein the diameter of a substantially circular chucking hole formed on a center part after the formation of the resin layer is smaller on the resin layer side than on the disc-shaped substrate material side.

BEST MODE FOR CARRYING OUT THE INVENTION

An embodiment of the present invention will be described in detail below with reference to the accompanying drawings.

Figure 1:
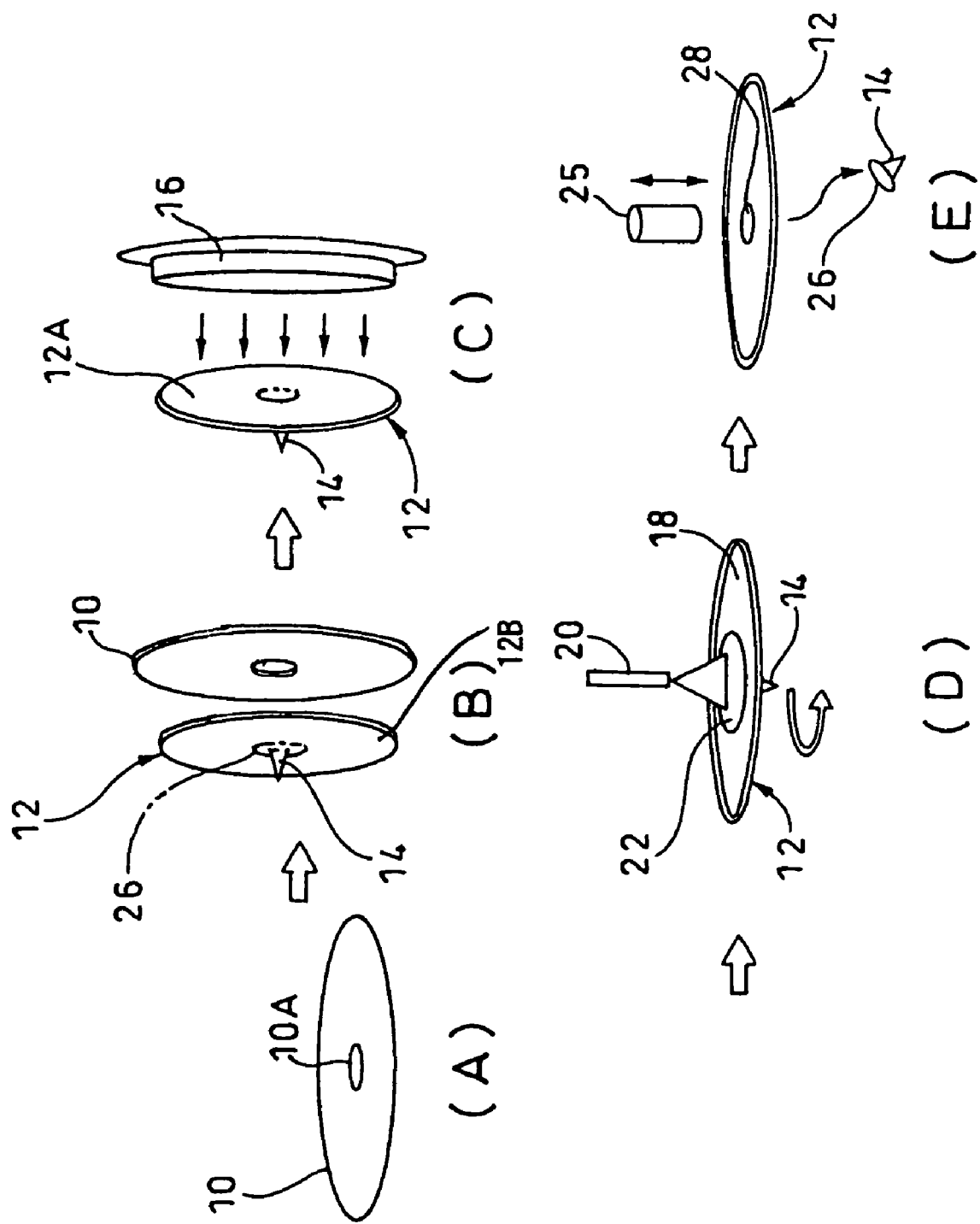
FIG. 1 is a schematic perspective view showing a method for manufacturing a disc-shaped optical recording medium according to an embodiment of the present invention.

Description is now given to a method for manufacturing a disc-shaped optical recording medium according to a first example of the embodiment of the present invention, with reference to FIG. 1.

According to the manufacturing method, at first, a stamper 10 (refer to FIG. 1(A)) formed with a pattern as a master for forming an information recording surface is set within a mold assembly (not shown). Then, a synthetic resin is injected into the cavity of the mold assembly to form a disc-shaped substrate material 12.

In the injection molding process, without having to punch a center part 26 in the disc-shaped substrate material 12, i.e., without having to form a center hole 28 (refer to FIG. 1(E)), the disc-shaped substrate material 12 is taken out integrally with a sprue runner 14 from the mold assembly, followed by sputtering and spin coating or the like. Subsequently, the center part 26 is removed along with the sprue runner 14, thereby forming the center hole 28.

In the following, description will be given to a case in which the disc-shaped substrate material 12 is processed integrally with the sprue runner 14.

Here, film formation through sputtering and formation of light transmitting resin layer through spin coating are all performed on the information recording surface 12A side of the disc-shaped substrate material 12.

Preferably, the sprue runner 14 is formed on a non-recording surface 12B side which is an opposite side to the information recording surface 12A of the disc-shaped substrate material 12, or is formed on the information recording surface 12A side by using a hot runner.

In the mold assembly, after a synthetic resin is injected into the cavity of the mold, a solidified disc-shaped substrate material 12 is taken out therefrom, without having to punch the center part 26. The taken-out disc-shaped substrate material 12 is integrally formed with the center part 26 and the sprue runner 14.

Figure 2A:
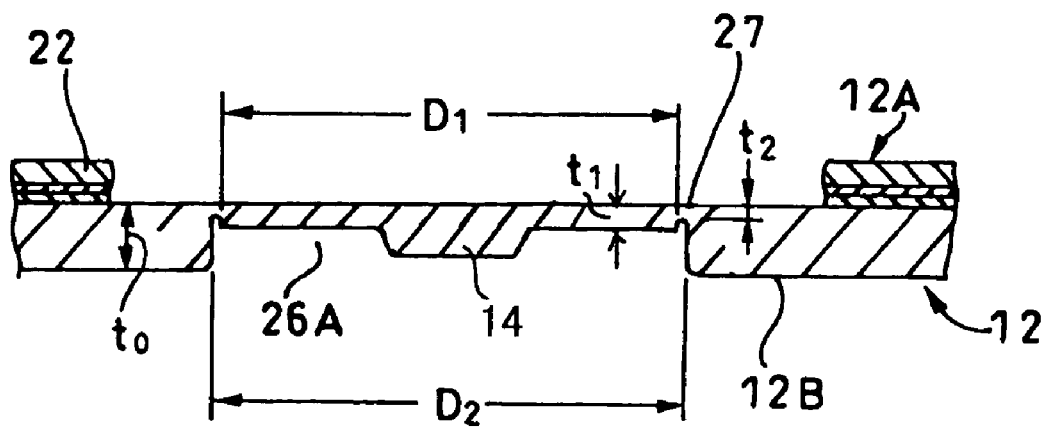
FIG. 2 is an enlarged cross sectional view showing a center hole formation state when using the same manufacturing method.

Although the disc-shaped substrate material 12 and the center part 26 should not be limited to any specific shape, they are preferable to be formed into an integral body through a ring-like punching portion 27, as shown in FIG. 2(A). In the case where the disc-shaped substrate material 12 is formed through injection molding, the thickness $t_1$ of the center part is preferable to be $t_1$=0.3 mm or more so as not to damage the flowability of the resin (in order to ensure a good moldability). If this portion is used for positioning, such thickness is preferable to be thinner than the thickness to of the disc-shaped substrate material 12. For example, it is preferable to form a circular concavity 26A on the disc-shaped substrate material 12 side (opposite side to the resin layer), and to ensure $t_1<t_0$. Further, considering the flowability of the resin at the time of injection molding, the thickness $t_2$ of the punching portion is preferable to be 0.1 mm or more, but is preferable to be 0.3 mm or less if an easy punching is to be ensured.

At the time of punching, in order to avoid a trouble caused due to a contact between a punching member (punching cutter) and the disc-shaped substrate material 12 and to prevent generation of burr due to a punching operation, it is necessary to perform a punching on the resin layer side (the light transmitting resin layer 22 side) at an extent smaller than a punching on the disc-shaped substrate material 12 side, as in the present invention. Specifically, the diameter $D_1$ (resin layer side) of the center part 26 should be 0.02 mm (or more) smaller than the diameter $D_2$ (disc-shaped substrate material side) of the circular concavity 26A, preferably 0.04 mm (or more) smaller than such diameter. However, if such difference is too large, there will be a problem that the rigidity on the end surface of the resin layer becomes inadequate and is thus not desirable.

Figure 2B:
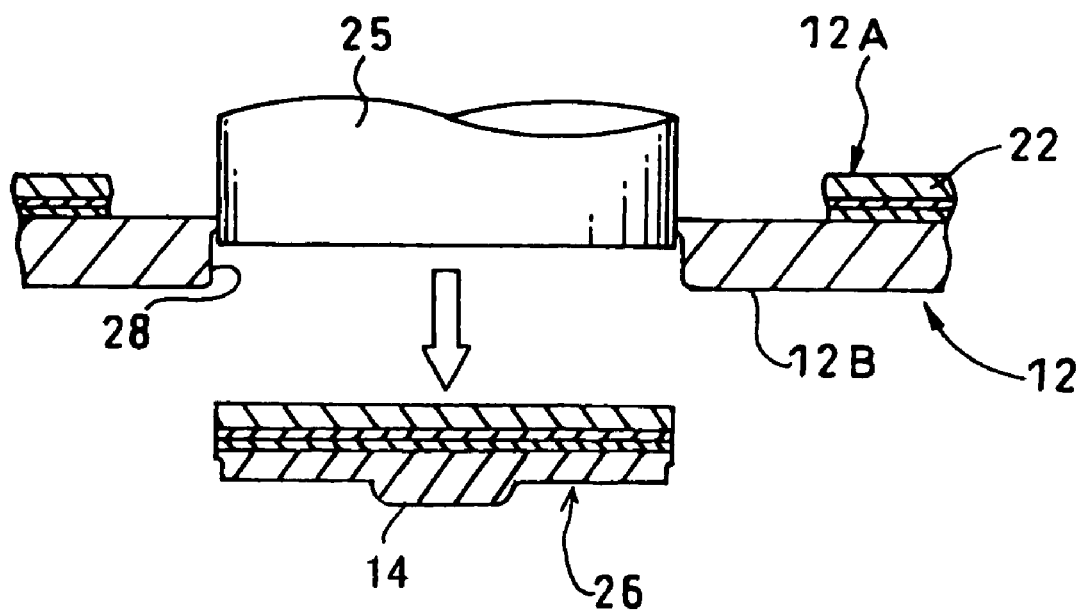

Further, the inner circumferential wall of the center hole, represented by the reference numeral 28 in FIG. 2(B), is also allowed to be enlarged downwardly in the figure so as to form a slight draft taper, thereby ensuring $D_2>D_1$.

In this state, after completing film formation and the formation of the light transmitting layer 22 as shown in FIG. 1(C) and FIG. 1(D), an ultrasonic press 25 is used or a simple punching operation is performed to remove the above center part 26 so as to form the center hole 28, as shown in FIG. 1(E).

At the time of forming the center hole 28, if for example an ultrasonic press 25 shown in FIG. 1(E) is employed, the center part 26 is removed from the information recording surface 12A side (resin layer side) towards the non-recording surface 12B side (disc-shaped substrate material side).

In this way, when the center part 26 is punched from the disc-shaped substrate material 12, as shown in the enlarged view of FIG. 2(A), the diameter of the formed center hole 28 becomes $D_1$ on the information recording surface 12A side, and becomes $D_2$ larger than $D_1$ on the non-recording surface 12B side.

By setting the punching direction of the center part 26 in the above-described manner, it is possible to effectively prevent the formation of burr which would otherwise be generated due to an ultrasonic press or a simple punching, thereby avoiding the generation of burr on the non-recording surface 12B side and the information recording surface 12A side. Even if such burr is generated, it will appear slightly in the punching portion 27, facing the non-recording surface 12B, and enclosed within the center hole 28, thus avoiding an undesired influence when the disc is being loaded onto a disc drive.

In this way, the diameter of the center hole 28 can be made coincident with the diameter of an ultrasonic press or a simple punching tool on the information recording surface 12A side, thus obtaining an exact and sharp edge.

Next, description will be given to a step of positioning the center part 26 during a center part removing process.

Figure 3:
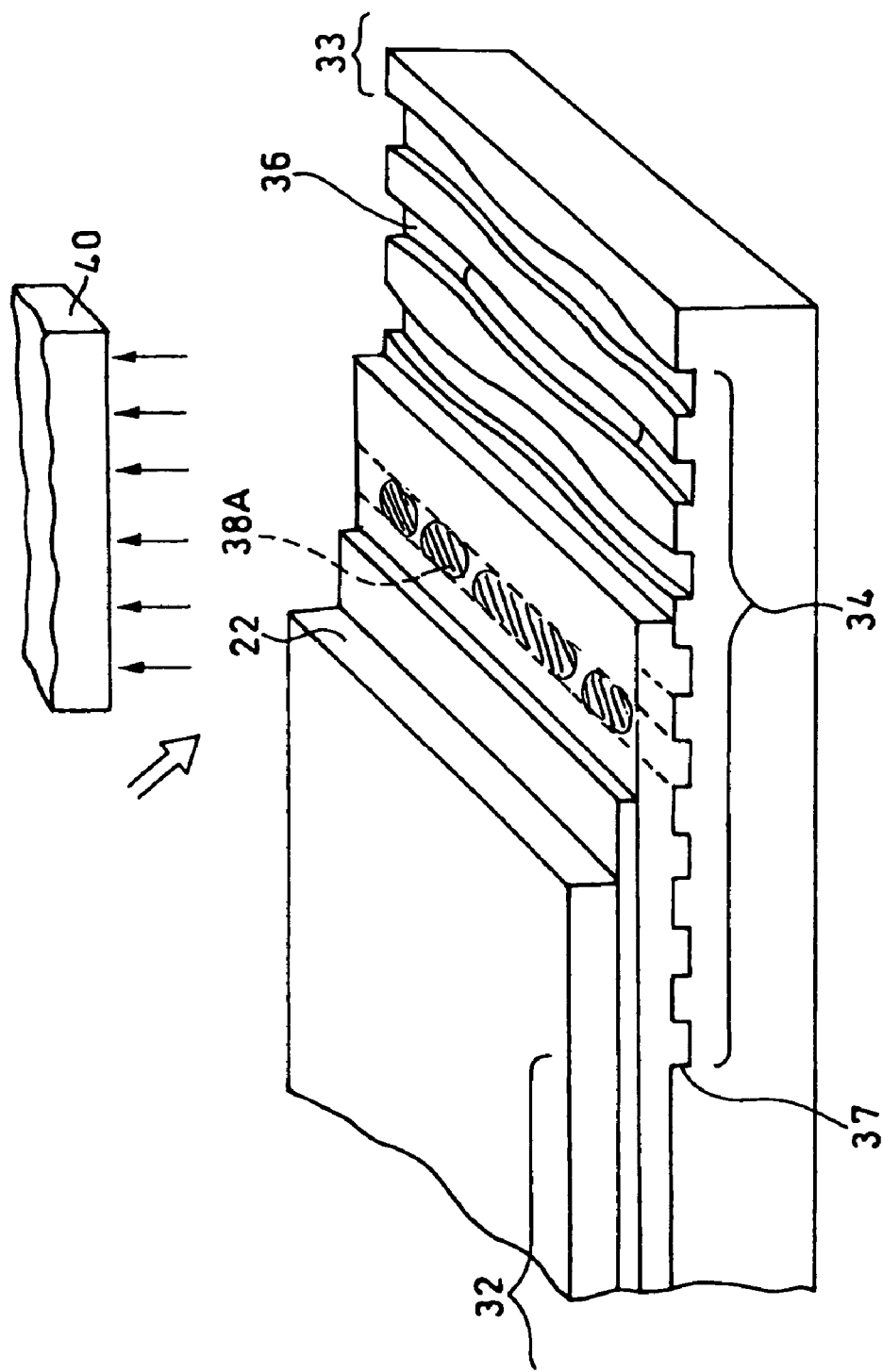
FIG. 3 is a partially sectional perspective view showing a disc-shaped substrate material before the completion of the same disc-shaped optical recording medium.

As shown in FIG. 3, a disc-shaped optical recording medium 30 is usually formed in a manner such that its information recording surface 12A side is provided with a mirror area 32 which is adjacent to the outside of the center hole 28 and on which no information is recorded, and that a recording area 34 is provided outside the mirror area 32, while an outer circumferential area 33 on which no information is recorded is formed on the outside of the recording area 34.

The recording area 34 is formed with information recording grooves 36 arranged spirally or concentrically, with information recording pits formed within the grooves 36 if necessary.

At the time of forming the center hole 28, either when an ultrasonic press 25 is used or when a simple punching operation is performed, it is necessary for the center of a tool to be coincident with the center part 26 of the disc-shaped substrate material 12.

In the manufacturing method according to an example of the present embodiment, the grooves 36 are provided in the aforementioned recording area 34 or continuous pit areas 38A are formed continuously in advance in the recording area, followed by irradiating the disc-shaped substrate material 12 which has been set such that a punching operation can be performed thereon, with a beam passing through the light transmitting resin layer 22. The reflected light of the beam is received by optical detecting means such as a CCD line sensor 40, so as to detect the grooves 36 or the continuous pit areas 38A, thereby positioning the center part 26.

In this way, a deviation between the shape of the disc-shaped substrate material 12 and the center hole 28 formed in the center part of the substrate material is reduced, and it is possible to inhibit an eccentricity occurred when the disc-shaped optical recording medium 30 is loaded onto a drive.

In the above-described example of the embodiment, the positioning of the centerpart 26 during the process of forming the center hole 28 is carried out by detecting the grooves 36 or the continuous pit areas 38A in the recording area 34 by using the CCD line sensor 40, thereby using the grooves or the pit areas as positioning reference. However, the present invention is not limited by this, provided that it is possible to optically detect the positioning reference of the center part 26 of the disc-shaped substrate material 12.

Accordingly, it is also allowable to use the CCD line sensor 40 or other optical detecting means, for example, to detect a boundary line 37 located between the aforementioned mirror area 32 and the grooves 36 adjacent to the outside of the mirror area 32, thereby using this boundary line 37 as a positioning reference of the center part 26.

Namely, the positioning reference of the center part 26 at the time of opening the center hole is allowed to be only partial area of the information recording surface 12A, such as information tracks or the like.

Further, as another method of positioning the center part 26 during the center part removing process, it is allowed to in advance perform an alignment (center alignment) between a punching member (punching cutter) and a positioning member facing the punching member, and to position and fix the outer periphery end surface of the disk-like substrate material 12 on the positioning member, or to position and fix the circular concave portion 26A formed in advance in the vicinity of the center part by making use of such concave portion, thus performing a punching operation in the mechanically determined state.

Figure 4:
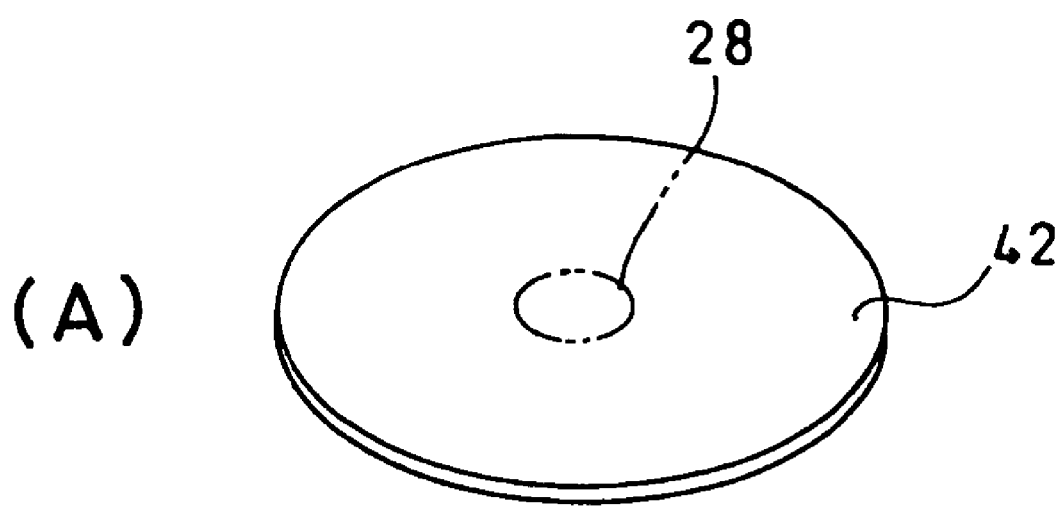
FIG. 4 is a schematic perspective view showing a disc-shaped substrate material having another shape and used in carrying out the manufacturing method of the present invention.
Figure 4:
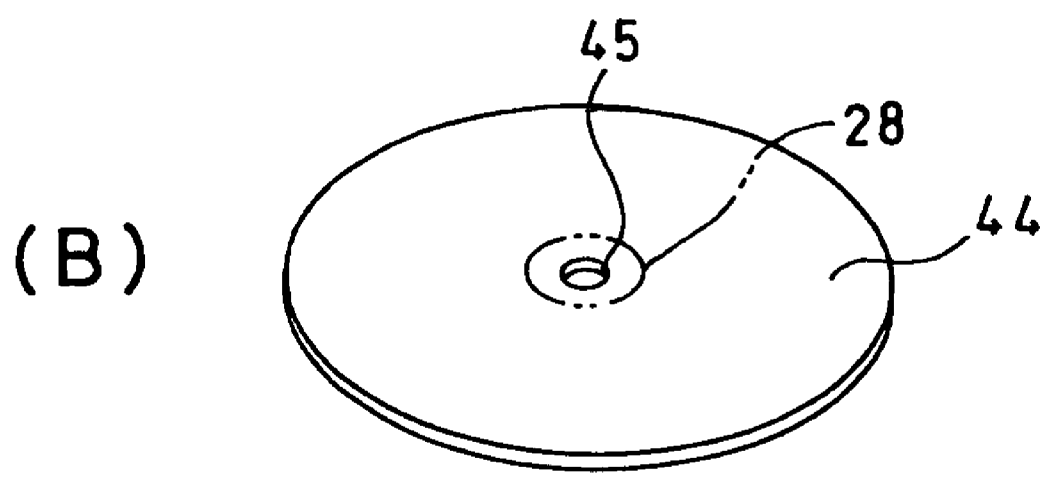

The above-described embodiment has shown that the disc-shaped substrate material 12 taken out of a mold for injection molding is integrally formed with a sprue runner 14. However, as mentioned above, the present invention is not limited thereto. Rather, the invention can be generally applied to a method for manufacturing a disc-shaped optical recording medium, in which processing is performed on a disc-shaped optical substrate material 42 (refer to FIG. 4(A)) not integrally formed with the sprue runner and not formed with the center hole, or on a disc-shaped substrate material 44 (refer to FIG. 4(B)) formed with a hole 45 having a diameter smaller than the center hole 28, with the center hole 28 being formed at the last step, thereby completing the manufacturing process.

Preferably, the center hole 28 is circular. However, such center hole is allowed to be deformed to some extent and is allowed to be formed into a generally circular shape, provided that it functions as a chucking hole when the disc-shaped optical recording medium 30 is loaded onto a drive.

INDUSTRIAL APPLICABILITY

Since the present invention is constituted as described above, it can provide an excellent advantage that the generation of burr in the formed center hole on the disc drive loading side may be avoided, thereby inhibiting an eccentricity amount of a disc-shaped recording medium at the time of information recording/playback.

The invention claimed is:

1. A method for manufacturing a disc-shaped optical recording medium, comprising the steps of forming at least a resin layer on one side of a disc-shaped substrate material, and removing a center part thereof substantially circularly in a manner such that the diameter of the center hole on the resin layer side becomes smaller than the diameter of the center hole on the disc-shaped substrate material side, thereby forming a chucking hole.

2. The method for manufacturing a disc-shaped optical recording medium according to claim 1, wherein the center part is removed from the resin layer side.

3. The method for manufacturing a disc-shaped optical recording medium according to claim 1, wherein at the time of removing the center part, a partial area confirmable from said resin layer side is used as a reference in positioning.

4. The method for manufacturing a disc-shaped optical recording medium according to claim 2, wherein at the time of removing the center part, a partial area confirmable from said resin layer side is used as a reference in positioning.

5. The method for manufacturing a disc-shaped optical recording medium according to claim 1, wherein at the time of removing the center part, a partial area on the disc-shaped substrate material side is used as a reference in positioning.

6. The method for manufacturing a disc-shaped optical recording medium according to claim 3, wherein the partial area used as the reference for positioning is an information track for recording information, the information track is optically detected and used as the reference for positioning the center part.

7. The method for manufacturing a disc-shaped optical recording medium according to claim 4, wherein the partial area used as the reference for positioning is an information track for recording information, the information track is optically detected and used as the reference for positioning the center part.

8. The method for manufacturing a disc-shaped optical recording medium according to claim 3, wherein on an information recording surface formed on the resin layer side and containing at least one of a groove and a pit for recording/playing back information, there is provided a continuous area of the one of the groove and the pit serving as a positioning reference, and the continuous area is optically detected and used as the reference for positioning said center part.

9. The method for manufacturing a disc-shaped optical recording medium according to claim 4, wherein on an information recording surface formed on the resin layer side and containing at least one of a groove and a pit for recording/playing back information, there is provided a continuous area of the one of the groove and the pit serving as a positioning reference, and the continuous area is optically detected and used as the reference for positioning said center part.

10. The method for manufacturing a disc-shaped optical recording medium according to claim 3, wherein the disc-shaped optical recording medium has a groove-containing recording area on the resin layer side, and a mirror area located inside or outside the recording area, and wherein a boundary line between the mirror area and the grooves of the recording area is optically detected and used as the reference for positioning the center part.

11. The method for manufacturing a disc-shaped optical recording medium according to claim 4, wherein the disc-shaped optical recording medium has a groove-containing recording area on the resin layer side, and a mirror area located inside or outside the recording area, and wherein a boundary line between the mirror area and the grooves of the recording area is optically detected and used as the reference for positioning the center part.

12. The method for manufacturing a disc-shaped optical recording medium according to claim 6, wherein a CCD line sensor for detecting a reflected beam from the resin layer side is used to optically detect the reference for positioning.

13. The method for manufacturing a disc-shaped optical recording medium according to claim 5, wherein the partial area located on the disc-shaped substrate material side and used as the reference for positioning is a concave portion formed substantially circularly near the center of the disc-shaped substrate material.

14. The method for manufacturing a disc-shaped optical recording medium according to claim 5, wherein the partial area located on the disc-shaped substrate material side and used as the reference for positioning is an outer periphery edge portion of the disc-shaped substrate material.

15. A disc-shaped optical recording medium, having at least a resin layer on a disc-shaped substrate material, wherein the diameter of a substantially circular chucking hole formed on a center part after the formation of the resin layer is smaller on the resin layer side than on the disc-shaped substrate material side.

16. The method for manufacturing a disc-shaped optical recording medium according to claim 8, wherein a CCD line sensor for detecting a reflected beam from the resin layer side is used to optically detect the reference for positioning.

17. The method for manufacturing a disc-shaped optical recording medium according to claim 10, wherein a CCD line sensor for detecting a reflected beam from the resin layer side is used to optically detect the reference for positioning.

* * * * *